United States Patent [19]
Bruce

[11] 3,991,719
[45] Nov. 16, 1976

[54] ANIMAL FEEDING RECEPTACLE
[76] Inventor: David Bruce, 1330 Alta Vista, Hollywood, Calif. 95234
[22] Filed: Sept. 15, 1975
[21] Appl. No.: 613,579

[52] U.S. Cl. .................................................. 119/61
[51] Int. Cl.² ........................................ A01K 5/00
[58] Field of Search ................... 119/61; 220/17, 63, 220/65

[56] References Cited
UNITED STATES PATENTS

| 2,188,111 | 1/1940 | Grandinetti | 220/65 |
| 2,213,837 | 9/1940 | Gill | 220/17 |
| 3,512,338 | 5/1970 | Nestler | 220/65 X |
| 3,527,192 | 9/1970 | Ferrara | 119/61 |
| 3,698,594 | 10/1972 | Boehlert | 119/61 X |

Primary Examiner—Hugh R. Chamblee
Attorney, Agent, or Firm—Poms, Smith, Lande & Glenny

[57] ABSTRACT

An animal feeding receptacle comprising a holder having a bowl shape for supporting, holding and storing a quantity of nested correspondingly bowl shaped liners in upwardly facing position, and an adjustable sleeve retainer for holding said quantity of liners in nested relation in the holder, slidably frictionally fitted with the holder, exposing the uppermost liner for use while protecting circumferential edges of the nested liners, and having a flange for facilitating removal of the sleeve retainer from the bowl shaped holder and the quantity of separable liners.

6 Claims, 3 Drawing Figures

ANIMAL FEEDING RECEPTACLE

BACKGROUND OF INVENTION

Animal pets particularly dogs and cats, are usually fed from a bowl shaped container made of plastic or ceramic materials. Often the animal does not completely finish the food placed in the container and unless that food is immediately removed by washing, the leftover food tends to adhere to the surface of the container, drys, and becomes relatively hard to remove by usual washing methods. Particularly bothersome is moist canned pet food, especially those containing fish ingredients which create an unpleasant odor and stick to the surface of the feeding container with such tenacity as to require scouring and scrubbing to remove the leftover food.

It has been proposed that disposable liners for such pet feeding containers be used. Such a prior proposed re-usable holder supporting a disposable liner is disclosed in U.S. Pat. No. 3,653,362. A single liner was placed in the holder and the edge portions of the liner were protected by recessing the liner edge portions below an uppermost edge of the holder. This was for the purpose of preventing mutilation of the exposed edge of the liner which might become mixed with the food in the disposable liner.

When disposable replaceable liners were associated with a holder, problems occured in the removal of the liner. In U.S. Pat. No. 3,527,192 this problem was solved by providing an air trap between the bottom wall of the liner and the bottom wall of the receptacle. In U.S. Pat. No. 3,698,594 a disposable liner was temporarily attached to the receptacle by an adhesive and was then removed by a flip string or a cutaway portion of the receptacle.

Thus, while prior proposed uses of disposable liners with re-usable holders avoided the cleaning and scrubbing of the feeding dish, the use of such liners presented additional problems relating to the association of the disposable liners with the re-usable holders.

SUMMARY OF INVENTION

The present invention relates to a novel animal feeding receptacle which utilizes disposable liners but which avoids the problems previously associated with the use of disposable liners and provides an animal feeding receptacle means which possess advantages not found in prior proposed constructions.

The present invention contemplates an essentially three-part receptacle means in which a re-usable holder is adapted to support, hold and store a quantity of nested bowl shaped liners and an adjustable retaining means holds and protects the quantity of liners in nested relation while exposing the uppermost liner for use. In the present invention the uppermost liner of the stored quantity of liners is exposed and available for use and is held in secure assembly with the holder means by a sleeve-like retainer member which is provided a slidable fit with the wall of the holder means. The cylindrical sleeve retainer is provided with an inwardly extending top flange means which overlies the top circumferential edge portions of the nested quantity of liners and the cylindrical wall of the sleeve has sufficient depth to enclose the circumferential edges of the nested liners and to extend along the cylindrical wall of the holder means for frictionally holding the holder means, quantity of disposable liners, and sleeve retainer member in assembled relation.

The primary object of the present invention therefore is to provide a novel animal feeding receptacle means in which a clean disposable liner is substantially always provided for immediate use.

Another object of the present invention is to provide an animal feeding receptacle means in which a group of liners is stored in the re-usable liner holder means.

Another object of the invention is to disclose such an animal feeding receptacle means in which each of the liners of the group or quantity of liners is readily separable and removable from the adjacent liner.

A further object of the invention is to provide a means for securing a quantity of disposable liners in a re-usable holding means and wherein the quantity of liners regardless of number are secured in assembled relation with the holder means.

A still further object of the invention is to provide a retainer member for such an animal receptacle means which is readily slidably positioned relative to the holder means and the quantity of liners stored therein and having an inwardly directed flange protectively covering, engaging and securing the circumferential edge of the top liner.

Various other objects and advantages of the present invention will be readily apparent from the following description of the drawings in which an exemplary embodiment of the invention is shown.

IN THE DRAWINGS

Figure 1:
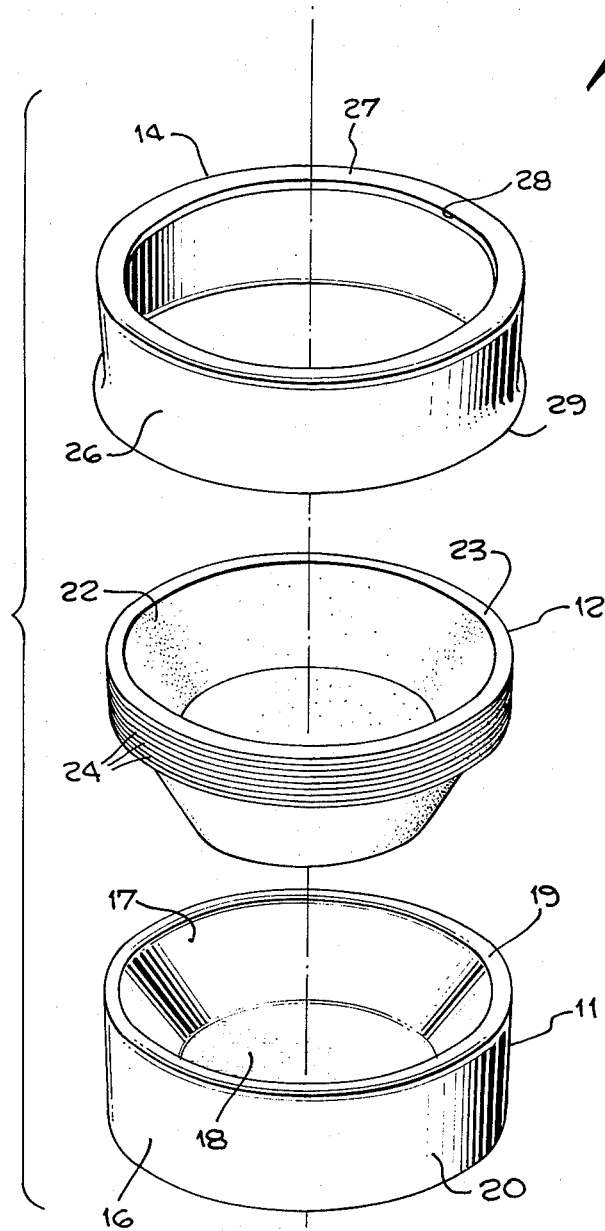
FIG. 1 is an exploded perspective view of an animal feeding receptacle means embodying this invention.
Figure 3:
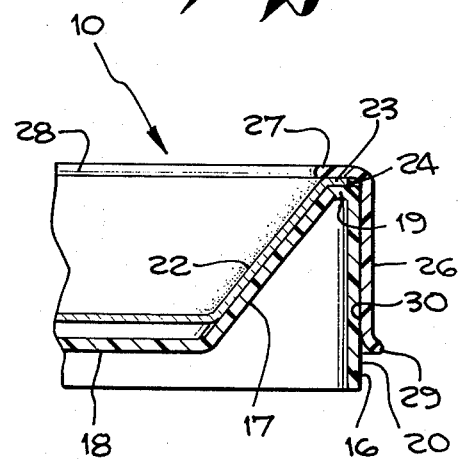
FIG. 3 is a fragmentary sectional view taken along a diameter of the receptacle means and showing the receptacle means in assembled relation with one disposable liner remaining.

In the drawings an animal feeding receptacle means embodying this invention is generally indicated at 10. Receptacle means 10 generally comprises a holder 11, a quantity or group of nested liners 12 receivable for storage and for use in holder 11, and a retainer member 14 slidably fitted over the quantity of liners 12 and the holder 11.

Holder 11 comprises a cylindrical wall 16 which encircles an interior bowl shaped chamber wall 17. Bowl shaped chamber wall 17 may be suitably inclined and have a bottom wall portion 18 of suitable diameter. Preferably, the configuration of the bowl shaped chamber wall 17 corresponds to the bowl shaped configuration of each of the liners 12 so that the liners may be supported by the chamber wall 17 without substantial distortion of the liners. Chamber wall 17 and cylindrical wall 16 are joined at a common top rim 19.

Preferably holder 11 is made of a one-piece molded plastic material. The holder 11 may be made in different sizes to accommodate the quantity of food required for different size animals. Plastic material readily adapts itself to use for a holder for this receptacle means because it is desirable that the outer circumferential surface 20 of the cylindrical wall 16 be smooth and of uniform diameter. It is also preferable that the top rim 19 be joined or merge with the exterior surface 20 of wall 16 along an edge of slight radius to facilitate engagement of the holder 11 with the retainer member 14.

The quantity of nested disposable liners 12 are each of the same shape and configuration and generally correspond to the bowl shaped configuraton of the chamber wall 17. Each disposable liner 12 comprises such a bowl shaped wall 22 which terminates at its top end in a circumferential edge portion 23. When in nested relation, the edges 24 of the circumferential edge portions 23 provide a cylindrical circumference of slightly less diameter than the diameter of the exterior surface 20 of wall 16 on holder 11. The circumferential edge portions 23 of the disposable liners 12 overlie and are seated upon the top rim 19 of holder 11.

Each disposable liner 12 may be made of material readily preformed into the desired shape and configuration, such material including plasticized paper, thin metal foil, wax paper, and various types of treated paper material. Such a treated paper material may be that presently used for paper dishes such as those used for picnics and the like. Such paper material is treated to be resistant to penetration by liquids or moisture from food products and is generally impervious to penetration by such food ingredients for a substantial time such as one or more days. Such paper material is water, grease and oil proof. Because of their plasticized or treated surface condition, individual liners 12 in nested relationship do not tend to stick together and are readily separated by inserting a fingernail or other object between the circumferential edge portions 23. It is contemplated that the quantity of disposable liners 12 may include stacks or groups of liners of from 12 to 30 liners and that such a stack of liners would be readily stored in the bowl shaped chamber defined by wall 17 of the holder 11. The height of the cylindrical edge formed by edges 24 of the liners should not be greater than the height of the wall 16 for reasons later described.

Figure 2:
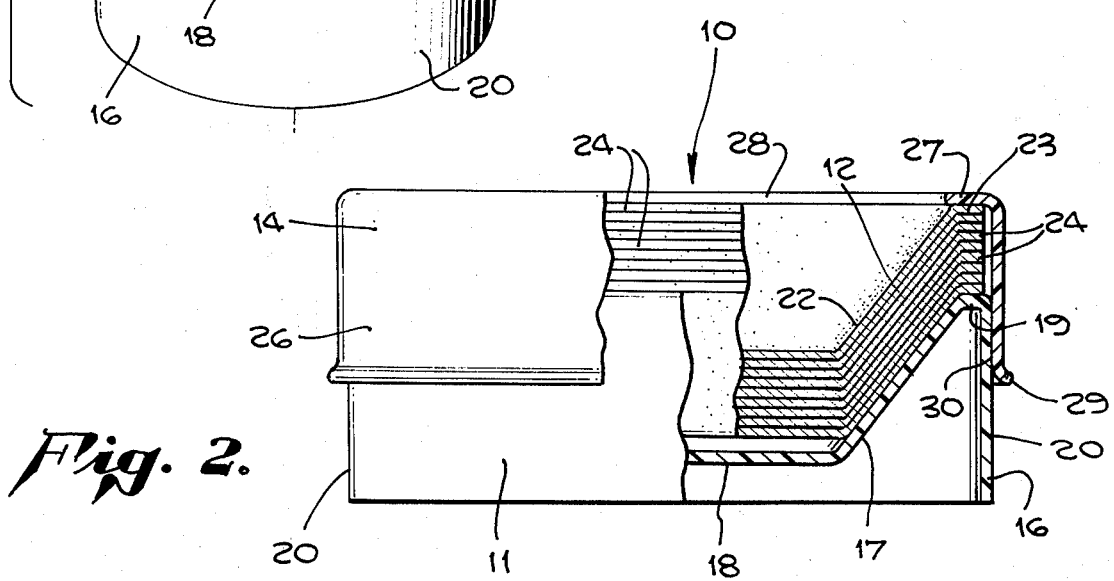
FIG. 2 is an assembled view of the receptacle means shown in FIG. 1, the assembled view being partly in section, the section being taken along a diameter of the receptacle means and portions of the retainer member and holder means being broken away to better show the assembly relationship.

Retainer member 14 comprises a cylindrical sleeve or wall 26 having a top flange means 27 directed radially inwardly and having an inner circumferential edge 28 which has a diameter approximately or slightly less than the inner diameter of the circumferential top edge portion 23 of liners 12. Flange means 27 thus overlies and protects the circumferential top edge portions 23 of the liners. Cylindrical wall 26 has a lower radially outwardly flared edge 29 which is spaced from the external cylindrical surface 20 of wall 16 to facilitate engagement of a finger when it is desired to lift the retainer member 14 out of its assembled relation with the holder 11 and liners 12. The inner cylindrical surface 30 of wall 26 of the retainer member slidably fits the external cylindrical surface 20 of wall 16 so that retainer 14 may be fitted over the group of nested liners to loosely, frictionally engage the wall 16 to retain the liners 12 and holder 11 in assembled with the retainer member 14. It should be noted that the depth of wall 26 is slightly less than the depth of wall 16 and the thickness of the circumferential edge portion of one liner 12 so that space is provided adjacent the bottom edge of holder 11 for insertion of a finger to slidably remove retainer member 14 from the holder 11. As noted in FIG. 2 the height or width of wall 26 should be great enough to fully cover the cylindrical edge formed by edges 24 of liners 12 and extend below the common top rim 19 of the holder. Thus if it is desirable to store a large quantity of liners 12 in holder 11 the height of walls 16 and 26 must be related to the height of the cylindrical edges 23 of the group of liners 12.

Assembly of the receptacle means and its use is readily apparent from the above description. A group or stack of liners of selected quantity such as 12 to 30 or more in nested relation are placed in the bowl shaped holder 11 and the retainer member 14 axially aligned with the liners and holder and slidably telescopically received thereover until the retaining flange means 27 presses against the circumferential edge portion 23 of the top liner 12. The slidable fit is such that the holder 11, liners 12 and retainer member 14 are held in assembled relation so that the three-part receptacle can be readily handled as a unit.

The uppermost liner 12 is exposed for placement and reception of animal food. After the animal has been fed, the uppermost liner 12 is readily removed by placing the thumbs of one's hands inside the receptacle to bear upon the uppermost liner 12 and the fingers of the hands beneath the outwardly flared edge 29 of the retainer member 14. Lifting upwardly on the edge 29 will readily slide the retainer member 14 out of engagement with holder 11. Upon removal of the retainer member 14 from its assembled relationship, the uppermost used liner 12 is readily separated from the group of liners, removed therefrom and disposed of in suitable manner. The next liner 12 is thus exposed for use and the retainer member 14 is slidably assembled with the group of liners and the holder. In such re-assembly of the retainer member 14, it will be apparent that the retainer member 14 when again placed in contact with the circumferential edge portion of the uppermost liner adjusts to the slightly decreased height of the edge portions of the group of nested liners.

After the last liner has been used, a new group of liners may be assembled with the base holder and retainer member.

It will be apparent that the receptacle means of this invention provides a clean disposable, separable liner for immediate use after the used liner has been disposed of. Since the holder 11 acts as a storage means for the nested liners, when the last liner is reached it will be immediately apparent that a new group of liners must be purchased and the supply of liners to be held by the holder 11 must be replenished.

It will be understood that the capacity of the receptacle means of this invention may be varied depending upon the size of the dog or animal to be fed. Thus, for cats and small dogs one size of receptacle means will be adequate while for large dogs such as great danes, a much larger capacity will be required. The receptacle means of this invention also contemplates the use of a bowl shape other than cylindrical such as an elongated elliptical shape or elongated rectangular shape. Such latter shapes may be desirable for dogs having exceptionally long ears which may or sometimes contact the food in a cylindrical shaped receptacle means.

Various changes and modifications may be made in the receptacle means described above which come within the spirit of this invention and all such changes and modifications coming within the scope of the appended claims are embraced thereby.

I claim:

1. An animal feeding receptacle means, comprising in combination:
    a holder including an interior bowl-shaped chamber wall, a cylindrical wall surrounding said chamber wall, said chamber wall and cylindrical wall having a common top rim;

a plurality of separable nested impervious bowl-shaped liners received within and stored in said bowl-shaped chamber, said liners having circumferential edge portions overlying said top rim, the uppermost liner being exposed for use;

and a retainer member for holding the nested liners in said chamber in assembly with said holder and comprising a cylindrical sleeve receivable over said nested liners and slidably fitted on the upper portion of said holder, said sleeve having a flange means at its top edge overlying and retaining said liner edge portions against said top rim of said holder.

2. In a receptacle means as stated in claim 1 wherein said sleeve has an outwardly flared bottom edge portion to facilitate removal of said retainer member.

3. In a receptacle means as stated in claim 1 including means on said sleeve to remove said retainer member from said holder.

4. A receptacle means as stated in claim 1 wherein the width of said cylindrical sleeve is at least greater than the thickness of the nested liner edge portions received within said chamber and is not greater than the height of the cylindrical portion of said cylindrical wall plus the thickness of one liner edge portion.

5. In a receptacle means as stated in claim 1 wherein said flange means on said retainer member extends radially inwardly to protectively closely overlie said liner edge portions, said retainer member being removable to remove the uppermost liner after use and returnable to assembled relation with the nested liners and holder means to expose the next liner for use.

6. In an animal feeding receptacle means adapted to provide storage for a quantity of separable liners with the uppermost liner being exposed for use, the combination of:

means for supporting, holding, and storing such a quantity of nested bowl-shaped liners in upwardly facing position; and self-adjustable means for retaining said quantity of liners in nested relation on said holder means while exposing the uppermost liner for use and having engagement with the uppermost liner to retain said quantity of liners in said holding means;

said adjustable means including a cylindrical wall slideably fitted along said holding and storing means for protecting and enclosing circumferential edges of said quantity of liners, said cylindrical wall having an in-turned annular flange overlying circumferential edge portions of said liners and positionable against the uppermost liner edge portion to retain said quantity of liners in assembled relation with each other, with said holding and storage means, and with said adjustable means.

* * * * *